Patented June 10, 1924.

1,497,043

UNITED STATES PATENT OFFICE.

MARY D. TAYLOR, OF ST. PETERSBURG, FLORIDA.

CITROUS-FRUIT PRODUCT AND METHOD OF MAKING SAME.

No Drawing. Application filed February 17, 1922. Serial No. 537,307.

*To all whom it may concern:*

Be it known that I, MARY D. TAYLOR, a citizen of the United States, and resident of St. Petersburg, county of Pinellas, State of Florida, have invented an Improvement in Citrous-Fruit Products and Methods of Making Same, of which the following is a specification.

The object of my invention is to provide a food product from citrous fruits, which may be manufactured in large quantities and with a uniform composition which shall correspond in all of its material constituents to a predetermined analysis based upon the composition or constituents of selected perfect fruit.

Heretofore, it has been common practice to prepare commercial products from citrous fruits by following haphazard procedure based upon the preparation of the fruits as they may come to hand and without a previous knowledge of the value of the fruit being treated in respect to its oils, juices and other essential constituents which enter into the value of the fruit as an edible product. The result of such procedure has been to make a commercial product which is constantly varying in its composition and in most cases inferior to what may be produced if procedure were followed to insure the composition corresponding continually to a predetermined requirement equivalent to the result to be produced only from the most perfect fruit.

By my improved process, I am enabled to utilize fruits of all degrees of desirability and including those ripening at different periods of the season and at the same time utilize the fruit in the production of a commercial food product which shall be not only uniform in character, but which shall at all times correspond to the highest quality of the same capable of being produced, such for example, as would arise from the practice of the general process with the use only of the most perfect fruit.

A further object of my invention is to so prepare and preserve the fruit product that it is self-preserved, that is to say, its own constituents constituting a special part of the fruit itself retained and incorporated in the product, acts as a preservative and eliminates the necessity of the use of extraneous preservatives, as has heretofore been customary.

In carrying out my improved process, as a preliminary to determine exactly what will be necessary in a practice of the process, I first select what may be deemed the most perfect fruit, considered from a point of view both as to palatability and value as a food, and such fruit is then carefully analyzed as to its component constituents to determine more particularly the percentage of essential oils, sugar and the acids contained therein, which are all to definitely enter, in similar proportions, into the final commercial product to be prepared. When these proportions are carefully determined, the process is thereafter practiced with the object of producing the commercial product having its component parts corresponding in proportion to those predetermined by the analysis of perfect fruit or approximating those of the said specially selected samples, and in doing so, it becomes necessary in the practice of my invention to test the products derived from each quantity of fruit being prepared as a batch, to determine (as a whole) its excess or deficiency in the oils, sugars and acids, or to previously test average samples of the said quantity of the fruit to be employed to determine the respective quantities of its constituents, so that in the commercial manufacture on a large scale, the excess or deficiency in either or all of the said constituents may be compensated for by the addition of the particular constituents necessary to increase the quantity or by the addition of a quantity of the fruit having a less than normal quantity of the constituent to lower the excess thereof in the general batch of fruit being subjected to treatment. In tropical climates, the fruit is continually ripening so that it will be understood that during any year there are a series of crops, as it were, of the fruit; and these crops, according to the seasons, may vary considerably in the actual proportion of the above stated constituents, and it is more particularly to insure a uniform commercial product throughout the year, employing the several seasonal batches of the fruit, that my invention is intended, as by this means the commercial product may be maintained of uniform quality throughout every year and from year to year, notwithstanding the constant variations in the character of the fruit, due, more particularly, to the different periods of the season in which it is ripening.

Referring now, more particularly, to the procedure in the commercial practice of my invention, the following are the main points to be kept in mind. As the fruit is received each day at the factory, analyses are made to determine how far from the predetermined quantities the oils, sugars and acids are contained. If the fruit being treated are oranges and the same are deficient in citric acid, then there is added additional citrous fruit or parts thereof rich in acid which will make up the deficiency in this respect. Such acid may be supplied from the addition of grape fruit or even lemons or limes. If the analysis shows the fruit to be deficient in sugar, this may be supplied by the addition of granulated sugar. These additions, of whatever character, are made in quantity, as all of the mass is mixed and treated under the same general conditions.

The essential oils are extracted from the skin of the fruit by abrading or macerating the surface. If there is an excess of oil, part of the skin may be peeled to remove the excess of the essential oil. The fruit is then cut up and the seeds are removed, but the surrounding skin enclosing the seeds is employed in the final product and for the particular purpose of giving to it a self-preservative quality, and thereby obviating the necessity of the addition of external preservatives which has heretofore been the common practice. The fruit in its subdivided form and with the seeds removed is then placed in a crusher or pressing machine, by which the juices and oils are squeezed out and the rag and pulp together with any seeds are separated from the juices (containing the sugar, acids and essential oils), the said rag and adjacent pulp constituting a gelatinous or glutinous surrounding body to the seeds and cloak thereof constituting the core. This cloak or immediate enclosing skin for the seeds is separated from the mass and added to the extracted juices and oils. If there is a deficiency in the amount of this cloak or skin of the seeds to meet the requirements for preservative qualities, additional quantities of this substance may be taken from cores removed from other fruit by a suitable coring machine and subsequently passed through a mashing machine. The quantity of this preservative ingredient from the fruit itself may be increased to such a degree as will correspond to the proportion found in the perfect fruit by the preliminary analyses or may be increased, if desired, as its purpose is essentially for preservation and not for flavor or food value.

In practice, it is preferable that the fruit shall first be cored so that all or substantially all of the seeds and adjacent parts are removed and may be treated separately to a pressing operation for purpose of separating the juices and obtaining the cloak from about the seeds and especially where an addititon of this constituent is required to be added to the mass of fruit juices; but where the cloak is not in excess of the preliminary analysis, the fruit need not be cored before being cut up and subject to the action of the press. It will also be understood that the utilization of the cloak as a preservative may be omitted if desired and the usual preservatives added to the product, and I, therefore, do not restrict myself in this respect.

When all of the juices and oils have been extracted from the given batch of fruit, and substantially corrected as to percentages of its constituents by additions of juices from other fruit to increase or reduce such percentages as may be necessary to bring the mass to approximately the constituent values of the preliminary test of the perfect fruit and preferably before any dehydration or concentration of the juices, a test or analysis of the juices is made to determine more accurately the ultimate percentages of acid and sugars present; and, before or after dehydration, as desired, a final correction is made by the addition of granulated sugar if the juices are too low in sweetness and addition of citric acid juices from other fruits of the same or different kinds, if the juices are too low in such acid. If desired, the additional citric acid may be added as commercial citric acid before or after dehydration of juices. Similarly, additions of the essential oils may be made before or after dehydration.

The fluid mass is required, before or after the final correction, to be dehydrated or concentrated to eliminate more or less or substantially all of the water, as may be desired, prior to its being processed or packed in the sealed containers.

After the product is strained, it is dehydrated by centrifugal action or by heat, or by both, the former to remove the excess of the water to be eliminated and the latter to complete the dehydration at a temperature of approximately 170° F. or under, which latter, aside from sterilizing the product, provides the heat for expelling the air in the final "processing" operation. This dehydrating process reduces the bulk approximately from 10% to 20%, by eliminating the water which, aside from having no food value, is a serious element leading to fermentation and putrefaction.

It will be understood that the dehydration may be done wholly by heat, but because of the time required by that method, have found it desirable to dehydrate by centrifugal action, preferably supplemented by heat as a final operation, and I, therefore, do not restrict myself as to the mode of obtaining dehydration. The use of heat as a final step is practically required in the processing operation for the deaeration of the product when being sealed in the containers. As before stated, the dehydration may be performed before or after the final addition of the citric acid and sugar or both, though desirably before such addition; and moreover, the dehydration is desirable after the batch of fruit to be treated, mixed with additional fruit (whose acid and oil constituents are in greater or less percentages as required), are passed to provide the juice mixtures to approximate the quality of the "test" juices of the perfect fruit, though I do not restrict myself strictly to such procedure, as separately dehydrated quantities of juices may be mixed to secure the qualities required.

While my improved process involves more care and skill and some increased cost over the ordinary processes for preparing dehydrated fruit juices heretofore practiced, nevertheless, I am enabled to produce a product which is uniform as to flavor and food value and also one which is self-preservative. It is preferably in the fluid form, but dehydration may reduce it to a paste or powder.

I have described my improved method and product produced thereby in that particularity which I deem best suited to commercial practice, but I do not restrict or confine myself to the minor or secondary details either as to method of procedure or the means employed for putting it into effect, as variations therein may be resorted to by those skilled in the art without a departure from the spirit of the invention.

Having now described my invention, what I claim as new and desire to secure by Letters Patent is:

1. The herein described method of producing a food product from citrous fruits having substantially uniform composition, which consists in first determining by analysis the relative proportions of citric acid and sugar contained in a perfect fruit of the kind to be treated and thereby provide a standard of quality, then treating a large batch of a similar kind of fruit by crushing the same to extract the juices and essential oils therefrom, then testing the product so provided to ascertain the relative proportions of sugar and citric acid contained, supplying additions of sugar and citric acid, either or both, as may be necessary to bring the product to a composition having relative proportions of sugar and citric acid substantially equivalent to that of the perfect fruit as determined by the preliminary analysis, and at a period after the large batch of fruit has been crushed to extract the juices and essential oils therefrom, dehydrating the same preliminary to subsequently processing it for commercial transportation.

2. The method according to claim 1, wherein the preliminary analysis of the perfect fruit also determines the percentage of essential oils contained, and thereafter extracting the essential oils together with the juices from the large batch of the fruit to be treated and determining the relative percentage of such essential oils and in case the same is deficient in quantity compared with the percentage determined in the preliminary analysis, and adding to the juices a sufficient additional quantity of similar oils taken from other fruit to make up the deficiency.

3. The method according to claim 1, wherein an approximate analysis is first made of samples of the fruit from the batch to be treated to determine the relative proportion of citric acid therein to that contained in the preliminary analysis, and thereupon adding to the large batch of fruit additional fruit or juices therefrom containing an excess or a deficiency of citric acid as may be desired to bring the percentage of the citric acid in the product of the batch to approximately correspond to that of the preliminary analysis, said additions being made before extracting the juices from the batch of fruit and the dehydration thereof.

4. The method according to claim 1, wherein the preliminary analysis of the perfect fruit also determines the percentage of essential oils contained and thereafter an approximate analysis is first made of samples of the fruit from the large batch thereof to be treated to determine the relative proportion of essential oils therein to that contained in the preliminary analysis, and thereupon removing part of the skins or adding to the batch of fruit additional skins of similar fruit or oils therefrom as may be necessary to bring the percentage of oils in the product of the batch to approximately correspond to that of the preliminary analysis, said removal or additions of the skins and their oils being made before extracting the juices from the batch of fruit.

5. The method according to claim 1, wherein the cloak from about the seeds of the large batch of the fruit to be treated is separated from the seeds and rag of the fruit and added to the juices pressed therefrom preliminary to the dehydration thereof, to provide preservative quantities to the final product.

6. The method of producing a preserved food product from fruits, which consists in separating the juices from the fruit, dehydrating the juices and separating the cloak from about the seeds of fruit and adding the same to the juices, said cloak constituents acting as a preservative element to the product.

7. A food product comprising the dehydrated juices of fruits retained in a state of preservation by the cloak taken from about the seeds of the fruit and incorporated with the dehydrated juices.

8. The herein described method of producing a food product from citrous fruits having substantially uniform composition, which consists in first determining the relative proportion of citric acid required to give a desired quality to the product, then treating a large batch of citrous fruit by crushing the same to extract the juices and essential oils therefrom, then testing the product to determine the percentage of the citric acid contained therein, then dehydrating the juices to a large extent by centrifugal action thereon, and thereafter adding to the dehydrated juices an additional quantity of citric acid, to make the entire quantity of citric acid substantially equal the proportion of citric acid predetermined as the desired amount to be contained in the product.

9. The invention according to claim 8, wherein the partially dehydrated product with its additional citric acid is further dehydrated under the influence and action of heat.

10. The invention according to claim 8, wherein the quantity of essential oils is also predetermined as desirable and the analysis of the juices of the batch of fruit is also to determine the proportion of essential oils contained therein, and wherein further an additional quantity of similar essential oils is added to the juices prior to complete dehydration to make the entire quantity of essential oils equal to the proportion of essential oils predetermined as the desired amount to be contained in the product.

In testimony of which invention, I hereunto set my hand.

MARY D. TAYLOR.